US011436782B2

(12) United States Patent
MacDonald et al.

(10) Patent No.: US 11,436,782 B2
(45) Date of Patent: Sep. 6, 2022

(54) ANIMATION OF AVATAR FACIAL GESTURES

(71) Applicant: CREAM DIGITAL INC., Toronto (CA)

(72) Inventors: Andrew MacDonald, Toronto (CA); Tristan Cezair, Toronto (CA); Stephan Kozak, Toronto (CA)

(73) Assignee: CREAM DIGITAL INC., Toronto (CA)

( * ) Notice: Subject to any disclaimer, the term of this patent is extended or adjusted under 35 U.S.C. 154(b) by 0 days.

(21) Appl. No.: 17/425,117

(22) PCT Filed: Jan. 22, 2020

(86) PCT No.: PCT/IB2020/050502
§ 371 (c)(1),
(2) Date: Jul. 22, 2021

(87) PCT Pub. No.: WO2020/152605
PCT Pub. Date: Jul. 30, 2020

(65) Prior Publication Data
US 2022/0108514 A1    Apr. 7, 2022

Related U.S. Application Data

(60) Provisional application No. 62/795,922, filed on Jan. 23, 2019.

(51) Int. Cl.
*G06T 13/40* (2011.01)
*G06T 15/04* (2011.01)
(Continued)

(52) U.S. Cl.
CPC ............ *G06T 13/40* (2013.01); *G06T 15/04* (2013.01); *G06T 15/50* (2013.01); *G06T 17/205* (2013.01)

(58) Field of Classification Search
CPC ......... G06T 13/40; G06T 15/04; G06T 15/50; G06T 17/205
See application file for complete search history.

(56) References Cited

U.S. PATENT DOCUMENTS 8,115,774 B2 * 2/2012 Biehn ..................... G06T 13/40
345/626
9,589,357 B2    3/2017 Li et al.
(Continued)

OTHER PUBLICATIONS

Shahin et. al, Human Face Recognition from Part of a Facial Image based on Image Stitching, (IJACSA) International Journal of Advanced Computer Science and Applications, vol. 12, No. 12, 2021, pp. 456-463 (Year: 2021).*
(Continued)

*Primary Examiner* — Phuc N Doan
(74) *Attorney, Agent, or Firm* — Perry + Currier Inc.

(57) ABSTRACT

Example systems, methods, and instructions to be executed by a processor for the animation of realistic facial performances of avatars are provided. Such an example system includes a memory to store a facial gesture model of a subject head derived from a photogrammetric scan of the subject head, and a video of a face of the subject head delivering a facial performance. The system further includes a processor to generate a dynamic texture map that combines the video of the face of the subject head delivering the facial performance with a static portion of the facial gesture model of the subject head, apply the dynamic texture map to the facial gesture model, and animate the facial gesture model of the subject head to emulate the facial performance.

17 Claims, 8 Drawing Sheets

(51) Int. Cl.
    *G06T 15/50*     (2011.01)
    *G06T 17/20*     (2006.01)

(56) References Cited

U.S. PATENT DOCUMENTS

| | | | | |
|---|---|---|---|---|
| 2004/0218827 | A1* | 11/2004 | Cohen | G06V 40/165 |
| | | | | 375/E7.255 |
| 2009/0132371 | A1* | 5/2009 | Strietzel | G06Q 30/02 |
| | | | | 705/14.46 |
| 2012/0038739 | A1* | 2/2012 | Welch | H04N 13/388 |
| | | | | 345/426 |
| 2012/0280974 | A1* | 11/2012 | Wang | G10L 21/10 |
| | | | | 345/419 |
| 2016/0042548 | A1 | 2/2016 | Du et al. | |
| 2016/0300379 | A1* | 10/2016 | Du | G06T 13/205 |
| 2017/0039750 | A1 | 2/2017 | Tong et al. | |
| 2020/0020173 | A1* | 1/2020 | Sharif | G06T 19/20 |
| 2021/0192243 | A1* | 6/2021 | Lin | H04N 13/111 |

OTHER PUBLICATIONS

Thomas, Augmented Blendshapes for Real-time Simultaneous 3D Head Modeling and Facial motion, CVPR, 2016, pp. 3299-3308 (Year: 2016).*

Lau et. al, Face Poser: Interactive Modeling of 3D Facial Expressions Using Model Priors, Eurographics/ACM SIGGRAPH Symposium on Computer Animation, Aug. 2007, pp. 10 (Year: 2007).*

Barbarianbros, "Myst V End of Ages—video game Making—of (ENG, 2005)" YouTube. Jan. 4, 2019. URL: https://www.youtube.com/watch?feature=emb_logo&time_continue=1046&v=T2hi3YXMO1E.

PCT/IB2020/050502, Animation of Avatar Facial Gestures, Jan. 22, 2020.

* cited by examiner

ANIMATION OF AVATAR FACIAL GESTURES

FIELD

The present disclosure relates to computer graphics, and in particular, to avatar animation in computer graphics.

BACKGROUND

Techniques for the animation of avatars in computer graphics are typically constrained by the processing power of the machines running the animations. Machines with higher processing power are able to render models in greater detail, or in other words, with a more detailed mesh or with a greater number of polygons. High-end productions of major motion pictures, for example, can afford to feature highly detailed animations, as the processing of such animations can be performed ahead of time using high-powered processing equipment. For animation processing that is to take place in real-time, however, such as in real-time virtual reality games, avatar animations are typically limited in detail so that the product is able to run on lower-end personal computing devices and gaming consoles.

SUMMARY

The present disclosure provides methods, systems, and instructions to be executed by a processor for the animation of realistic facial performances of avatars that are capable of running on relatively lower-powered machines.

According to an aspect of the disclosure, a method for animating a facial performance of an avatar is provided. The method involves photogrammetrically scanning a subject head performing a collection of facial gestures to develop a facial gesture model of the subject head, capturing a video of a face of the subject head delivering a facial performance, and generating a dynamic texture map. The dynamic texture map combines the video of the face of the subject head delivering the facial performance with a static portion of the facial gesture model of the subject head. The method further involves applying the dynamic texture map to the facial gesture model, and animating the facial gesture model of the subject head to emulate the facial performance.

According to another aspect of the disclosure, a non-transitory machine-readable storage medium is provided. The non-transitory machine-readable storage medium includes instructions that when executed cause a processor of a computing device to generate a dynamic texture map that combines a video of a face of a subject head delivering a facial performance with a static portion of a facial gesture model of the subject head. The facial gesture model is generated by a photogrammetric scan of the subject head performing a collection of facial gestures. The instructions further cause the processor to apply the dynamic texture map to the facial gesture model, and animate the facial gesture model of the subject head to emulate the facial performance of an avatar.

According to another aspect of the disclosure, a system for animating a facial performance of an avatar is provided. The system includes a memory to store a facial gesture model of a subject head derived from a photogrammetric scan of the subject head and a video of a face of the subject head delivering a facial performance. The system further includes a processor to generate a dynamic texture map that combines the video of the face of the subject head delivering the facial performance with a static portion of the facial gesture model of the subject head. The processor is further to apply the dynamic texture map to the facial gesture model, and animate the facial gesture model of the subject head to emulate the facial performance.

DETAILED DESCRIPTION

A facial performance of an avatar may be animated on a relatively lower-powered machine with high realism using the techniques described herein involving dynamic texture maps. A dynamic texture map may be understood to be similar to an ordinary texture map, but with UV-mapped regions (i.e., static regions) derived from a photogrammetric scan and projection-mapped regions (i.e., dynamic regions) derived from projecting a video onto a three-dimensional model of the avatar. The UV-mapped regions of a dynamic texture map correspond to areas of an avatar which do not change during the course of a particular animation, such as the back of the avatar's head during a facial performance. The projection-mapped regions correspond to areas of the avatar which do change during the facial performance, such as the avatar's face. As discussed herein, a dynamic texture map that contains the information for a facial performance of an avatar may be generated and applied to a relatively low-resolution (i.e. low-poly) model of an avatar to produce a highly realistic visual performance for relatively low cost and processing power that is competitive with visual performances produced by more costly techniques.

A facial performance of an avatar may also be animated on relatively lower-powered machines with high realism using the techniques described herein involving separate orifice meshes. Separate orifices meshes may be used to animate particularly troublesome areas of the avatar, such as the mouth and eyes of the avatar, by cutting out the troublesome area and placing a separate mesh slightly offset behind the troublesome area. As discussed herein, animating the mouth and eyes of an avatar separately from other parts of the avatar's head may reduce the occurrence of visual artefacts such as "skating" which occur when the edges of features of textures do not match with the edges of a geometric model to which the textures are applied.

Figure 1:
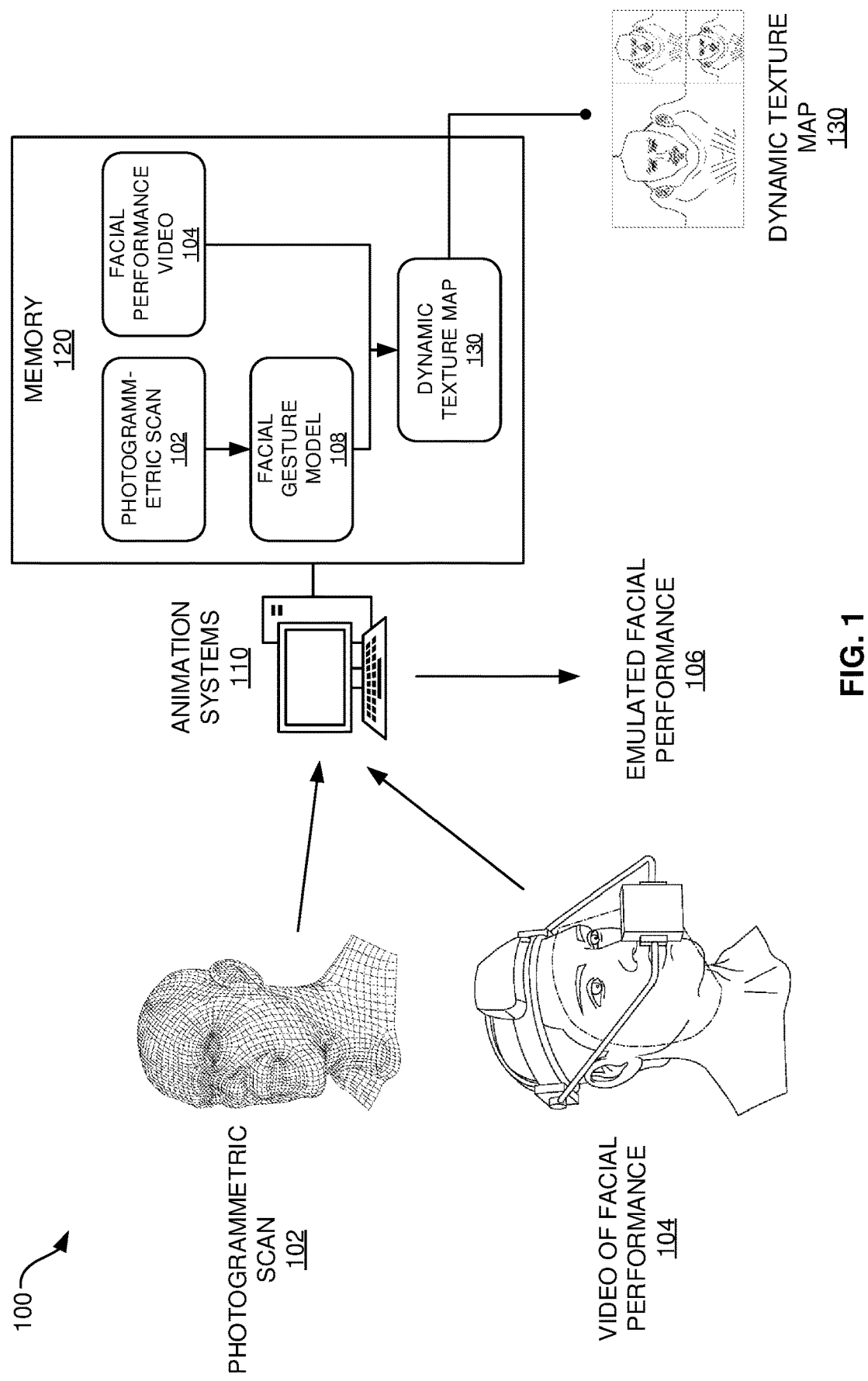
FIG. 1 is a schematic diagram of an example system for animating a facial performance of an avatar.

FIG. 1 is a schematic diagram of an example system 100 for animating a facial performance of an avatar. The system 100 includes animation systems 110, which include one or more computing devices that run animation, modelling, video processing, and/or game development software. The animation systems 110 have access to memory 120, which may include local storage of the animation systems 110, cloud storage stored on remote servers, or any other storage medium, to store data that is to be used by the animation systems 110.

In particular, the memory 120 is to store a facial gesture model 108 of a subject head that is derived from a photogrammetric scan 102 of the subject head. The memory 120 may store the photogrammetric scan 102 itself. The photogrammetric scan 102 of the subject head may be captured using any appropriate photogrammetric scanning equipment. The photogrammetric scan 102 involves capturing images of the subject head performing a collection of facial gestures (e.g. smiling, frowning) and from a number of different angles from around the subject head. The facial gesture model 108 includes a three-dimensional mesh of the subject head in various positions corresponding to these facial gestures. The facial gesture model 108 includes this collection of facial gestures, and may further include a number of blend shapes that are calculated to represent intermediate positions between collected facial gestures. The facial gesture model 108 may be applied to an avatar to enable the avatar to reproduce the facial gestures or blend shapes when programmed to do so.

In other words, the facial gesture model 108 may be termed a blendshape model, morph target, or vertex animation. The facial gesture model 108 may be rigged to receive an animation file that animates the facial gesture model 108. In some examples, the facial gesture model 108 may be a combination of blend shapes with joints or clusters that offset vertex positions and polygonal movement.

The memory 120 is also to store a video 104 of a face of the subject head delivering a facial performance. The video 104 may have been captured by a head-mountable camera facing the face of the subject head, or other video recording device, that records the face of the subject head as the subject delivers the facial performance.

The animation systems 110 use the facial gesture model 108 and the video 104 to generate a dynamic texture map 130 that combines the video 104 of the face of the subject head delivering the facial performance with static portions of the facial gesture model 108 of the subject head.

The dynamic texture map 130 includes one or more still frames from the photogrammetric scan 102 (i.e. the static portions of the facial gesture model 108) that have been UV-mapped onto plane to generate a two-dimensional texture that may be wrapped around a three-dimensional model of the subject's head. The UV-mapping may involve a conformal map, a Mobius map, or an or unwrapped map on the initial map creation. The portions of the dynamic texture map 130 that are covered by these one or more still frames may be referred to as a UV-mapped region 136 of the dynamic texture map 130 (see FIG. 3). These static portions of the facial gesture model 108 correspond to areas of the subject head that do not move, or that move only minimally, during the facially performance, and therefore can be considered to be substantially static (e.g. the back of the subject's head).

The dynamic texture map 130 further includes a re-captured projection of the video 104 onto a three-dimensional model of the subject's head, as discussed in greater detail in FIG. 4, below. The region of the dynamic texture map 130 that is covered by this re-captured projection of the video 104 is referred to as the projection-mapped region 134 of the dynamic texture map (see FIG. 3). In other words, the video 104 of the face moving during the facial performance is mapped to a projection-mapped region 134 of the dynamic texture map 130 (see FIG. 3).

Figure 3:
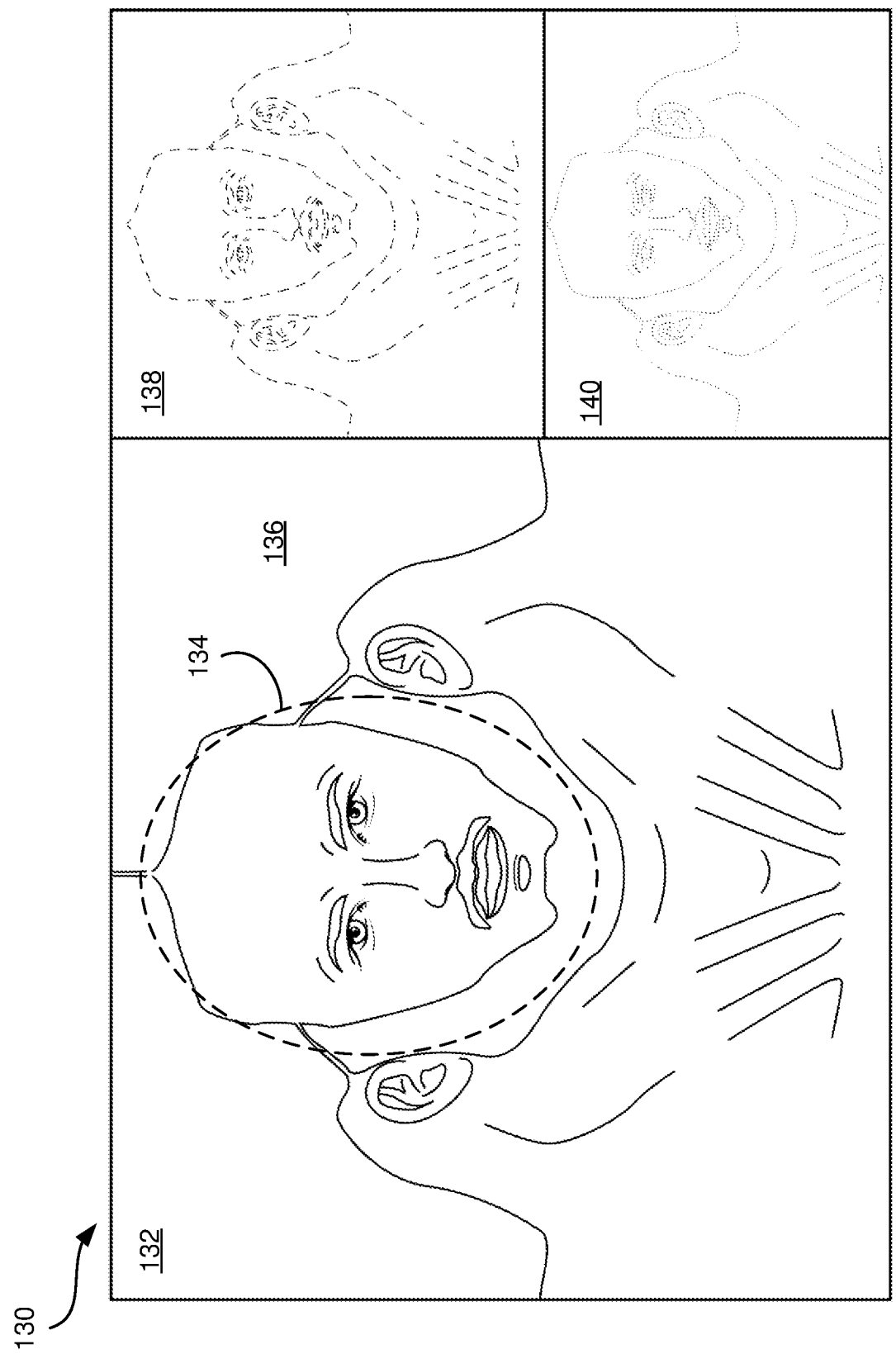
FIG. 3 is a schematic diagram of an example dynamic texture map for animating a facial performance of an avatar.

Thus, the dynamic texture map 130 comprises UV-mapped regions 136 (derived from the photogrammetric scan 102) and projection-mapped regions 134 (derived from images of the projection of the video 104 onto the facial gesture model 108) stitched together into the dynamic texture map 130 (see FIG. 3).

The animation systems 110 are further to apply the dynamic texture map 130 to the facial gesture model 108, and to animate the facial gesture model 108 of the subject head to generate an emulated facial performance 106. That is, the animation systems 110 are to apply the dynamic texture map 130 as a texture map to an avatar to animate the avatar to reproduce the facial performance as the avatar would in a game or video sequence. The animations systems 110 may store the resulting emulated facial performance 106 or the resulting instructions to cause an avatar to perform the emulated facial performance 106 in one or more files as part of a game, video, or other product.

Since the dynamic texture map 130 includes projection-mapped regions 134 that map only to the areas of the avatar that show movement, with the remainder being UV-mapped regions 136, processing power is saved, and therefore, more highly realistic visual performances may be produced that are competitive with visual performances produced by more costly techniques. Further, since the dynamic texture map 130 is derived at least in part from the video 104 of the subject's face, the dynamic texture map 130 includes subtle details (e.g. winkles, skin pores) that would be impractical to generate as part of a three-dimensional mesh without significantly more processing power.

Figure 2:
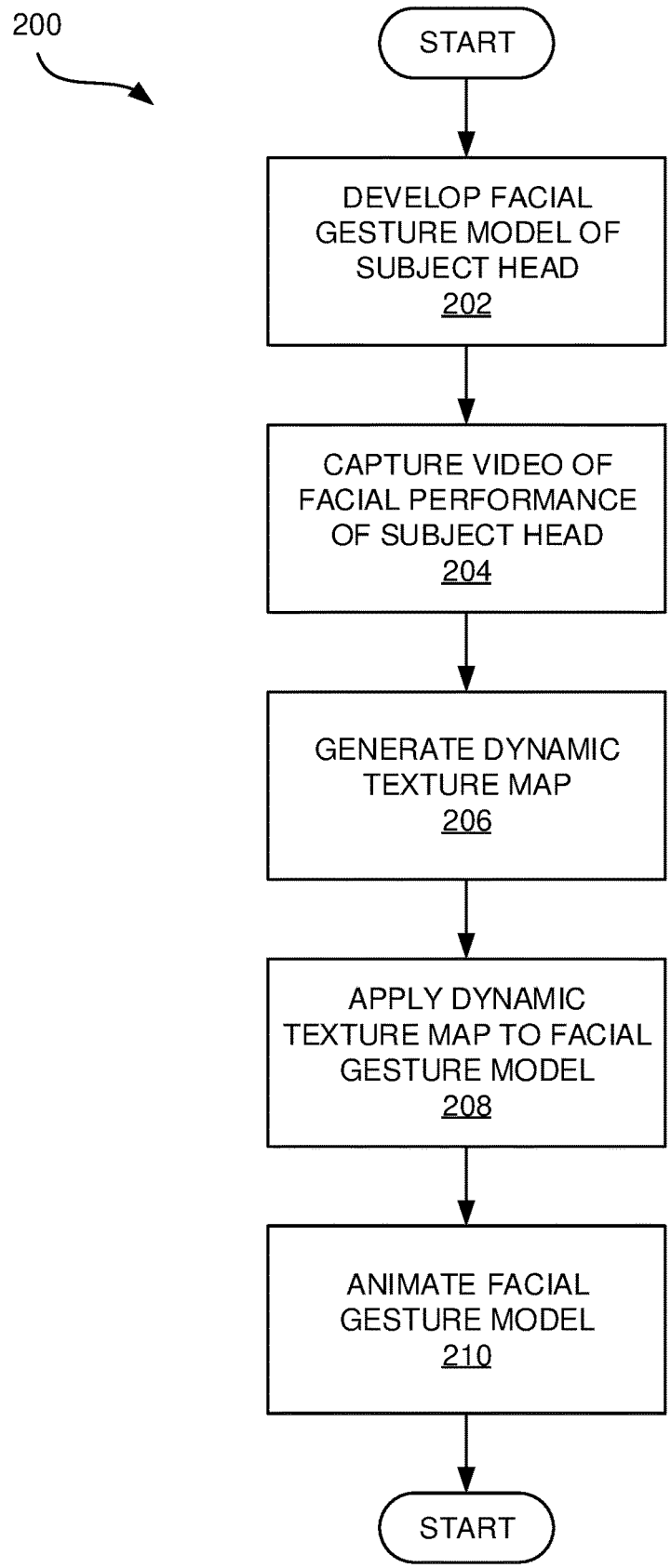
FIG. 2 is a flowchart of an example method for animating a facial performance of an avatar.

FIG. 2 is a flowchart of an example method 200 for animating a facial performance of an avatar. For convenience, the method 200 is described with reference to the system 100 of FIG. 1, but this is not limiting, as the method 200 may be applied to other systems. Further, one or more blocks of the method 200 may be embodied in programming instructions stored on a non-transitory machine-readable storage medium executable by a processor of a computing device.

At block 202, a facial gesture model 108 of a subject head is developed by photogrammetrically scanning the subject head performing a collection of facial gestures. That is, a subject head performing a series of facial gesture is photogrammetrically scanned. Individual photogrammetric scans are solved and combined into the facial gesture model 108 (i.e., a single blendshape model). The facial gesture model 108 is rigged to receive an animation file. Based on positional measurements, individual photogrammetric scans may be combined within a photoset to create a 3d polygonal model of a captured facial gesture.

At block 204, a video 104 of a face of the subject head delivering a facial performance is captured. The video 104 may be captured by a head-mountable camera facing the face of the subject head. An animation file is generated based on the video 104 of the facial performance of the subject head. That is, the video 104 is analyzed to generate an animation file, with which a blendshape model (e.g. the facial gesture model 108) may be rigged to emulates movements of the subject's face in the video 104. A three-dimensional model may be animated with a rigging structure that takes a static mesh and animates its positions through a combination of joints and clusters combined with morph targets or vertex animations that offset vertex positions and polygons to create an animation.

At block 206, the animation systems 110 generate a dynamic texture map 130 that combines the video 104 of the face of the subject head delivering the facial performance with a static portion of the facial gesture model 108 of the subject head. Generating the dynamic texture map 130 may involve matching or aligning features of the face of the subject head (as visible in the video 104) on top of the corresponding features of the subject head as visible in the image map 132. That is, generating the dynamic texture map 130 may involve overlaying the animation derived from the video 104 on top of the image map 132 to align the facial features. The method 200 may further involve stabilizing positions of the eyes of the subject head in the video 104 relative to the dynamic texture map 130. The method 200 may further involve replacing a portion of the video 104 that corresponds to the nose of the subject head with the UV-mapped texture of the nose.

At block 208, the animation systems 110 apply the dynamic texture map 130 to the facial gesture model 108. That is, the dynamic texture map 130 is baked into the facial gesture model 108 (i.e., the blendshape model).

At block 210, the animation systems 110 animate the facial gesture model 108 of the subject head to emulate the facial performance. That is, the facial gesture model 108 is rigged with the animation file generated at block 202.

In some examples, at least blocks 206, 208, and 210 may be embodied in instructions stored on a non-transitory machine-readable storage medium that cause a processor of a computing device to perform the blocks 206, 208, and 210. These instructions may be incorporated into an animation, modelling, or game development tool executable by the animation systems 110. Further, one or more of the blocks of the method 200 may be initiated or assisted by a user of the animation systems 110.

FIG. 3 is a schematic diagram of the dynamic texture map 130. The dynamic texture map includes at least an image map 132 that contains a projection-mapped region 134 that is filled by a sequence of images developed from the video 104, and a UV-mapped region 136 that is filled by imagery developed from the photogrammetric scan 102.

The dynamic texture map 130 may further include a specular map 138 that indicates how areas of the image map 132 will react to lighting in an environment when the image map 132 is applied to an avatar. The dynamic texture map 130 may further include a normal map 140 that determines how virtual light behaves when it strikes the image map 132 when it is wrapped onto a three-dimensional model. The dynamic texture map 130 may further include a bump map to simulate bumps or wrinkles on the surface of the avatar, a diffuse map to determine the colour and pattern of the surfaces of the avatar, displacement map, parallax occlusion map, or other maps that contribute to the animation of the avatar. The dynamic texture map 130, comprising the image map 132, specular map 138, normal map 140, and other maps, may be referred to as an "atlas" of such maps.

Figure 4:
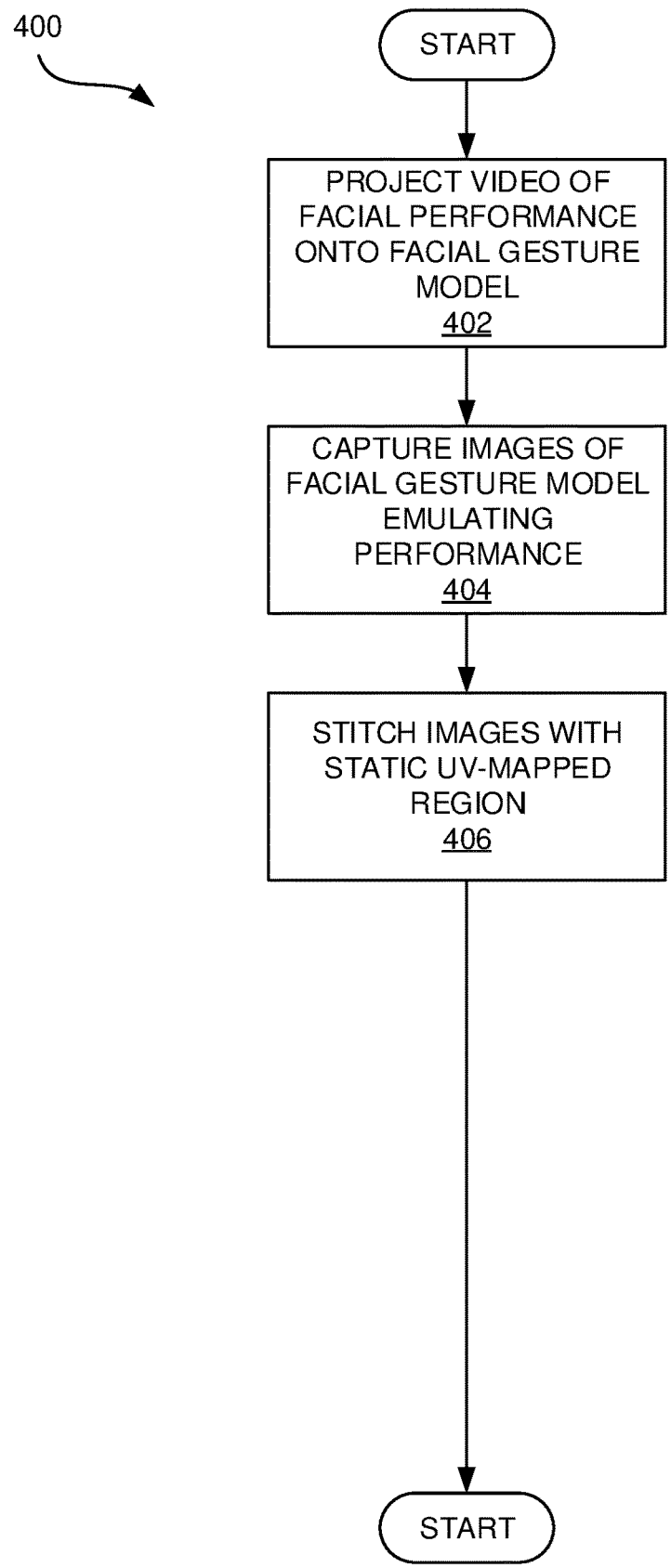
FIG. 4 is a flowchart of an example method for generating a dynamic texture map for animating a facial performance of an avatar.

FIG. 4 is a flowchart of an example method 400 for generating the dynamic texture map 130. The method 400 describes one way in which the dynamic texture map 130 may be generated, or in other words, describes one way in which the block 206 of the method 400 may be performed.

Figure 5:
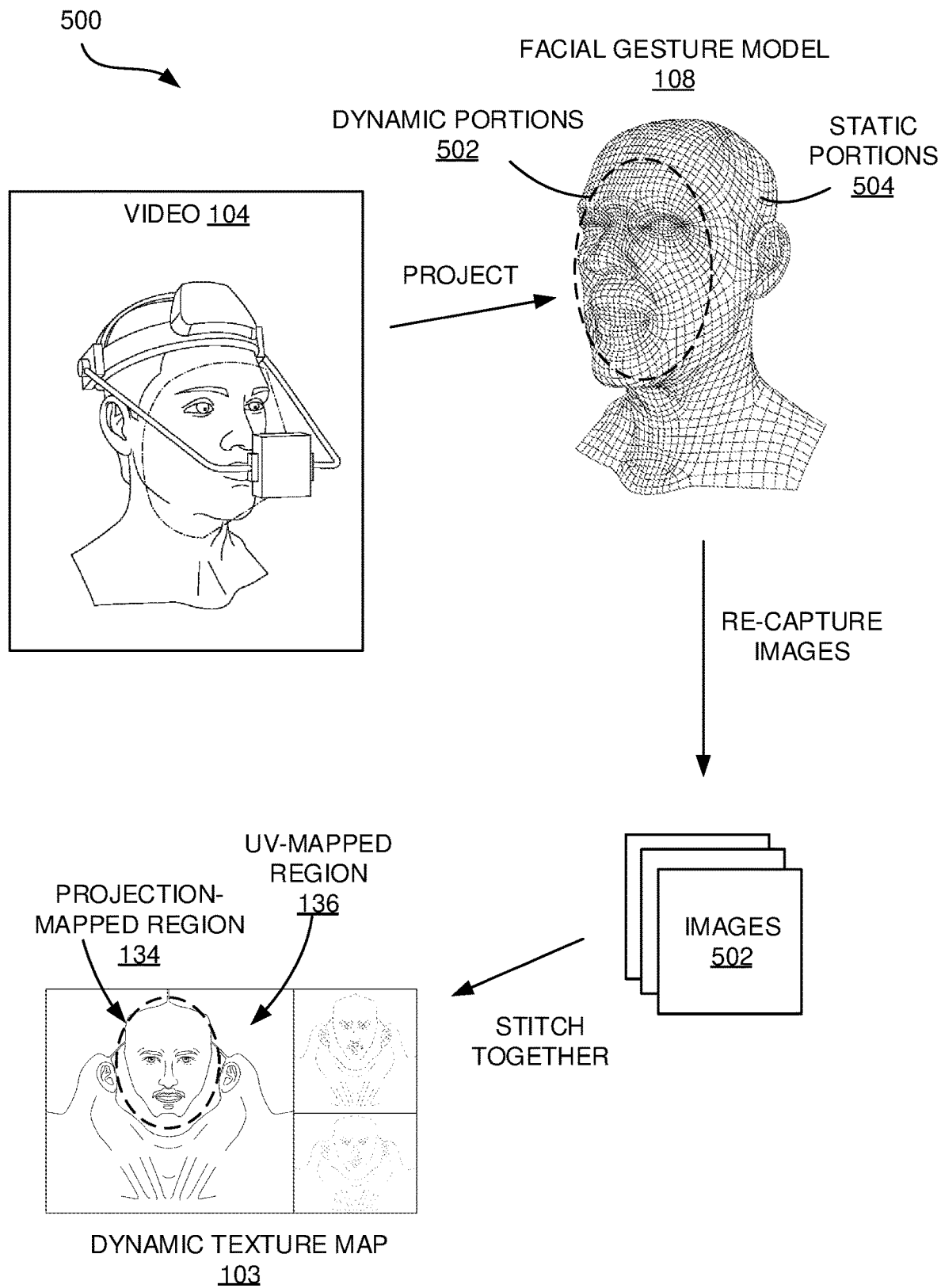
FIG. 5 illustrates execution of the method of generating a dynamic texture map of FIG. 4.

Thus, the method 400 is described with reference to the system 100 of FIG. 1, but this is not limiting, as the method 400 may be applied to other systems. Further, one or more blocks of the method 400 may be embodied in programming instructions stored on a non-transitory machine-readable storage medium executable by a processor of a computing device. These instructions may be incorporated into an animation, modelling, or game development tool executable by the animation systems 110. Further, one or more of the blocks of the method 400 may be initiated or assisted by a user of the animation systems 110. Application of the method 400 is visualized in FIG. 5 generally at 500, which may be referenced in parallel with FIG. 4.

At block 402, the video 104 (e.g. the animation file of the video 104) of the face of the subject head delivering the facial performance is projected (i.e., projection mapped) onto the facial gesture model 108 emulating the facial performance. That is, the video 104 is projected onto the facial gesture model 108 as the facial gesture model 108 is in motion (i.e., as the facial gesture model 108 is animated to act out the facial performance). The video 104 is projected onto the dynamic portions 506 (FIG. 5) of the facial gesture mode 108 (i.e., the face of the facial gesture model 108). The video 104 is projected onto the facial gesture model 108 in software, that is, in an animation, modelling, video processing, and/or game development software running on the animation systems 110. The video 104 may be projected from a virtual projector placed in the modelling environment directly in front of the face of the facial gesture model 108. The video 104 and emulation of the facial performance by the facial gesture model 108 is synchronized in time so that the projected images from the video 104 fall onto the geometrically appropriate places on the facial gesture model 108 at the appropriate time.

The video 104 itself may be visually distorted from the video capture process. For example, if the video 104 was captured using a head-mounted camera with a wide-angle (e.g. fish-eye) lens, the face of the subject will be distorted in the video 104. When the video 104 is projected onto the face of the facial gesture model 108, the projection distorts the video 104 in a manner that compensates for the distortion of the video 104 during capture. That is, projection of the video 104 onto the face of the facial gesture model 108 undistorts or re-distorts the imagery of the face of the subject head to more closely reflect the actual appearance of the face of the subject head when animated in the avatar. The UV-mapped region 136 remains undistorted by projection mapping.

At block 404, a series of images 502 of a face of the facial gesture model 108 (with the video 104 projected thereon) animated to emulate the facial performance is captured. This series of images 502 is captured frame-by-frame as the avatar is animated according to the facial performance. These re-captured images, which are "correctly" distorted, are ultimately stitched together with static portions 504 of the facial gesture model 108 to develop the dynamic texture map 130. As with the projection in block 402, this series of images 502 may be captured in software, that is, the series of images may be captured in an animation, modelling, video processing, and/or game development software running on the animation systems 110. The series of images 502 may be captured from a virtual camera placed in the modelling environment directly in front of the face of the facial gesture model 108.

At block 406, the series of images 502 of the face of the facial gesture model 108 emulating the facial performance is stitched or re-compiled together with the UV-mapped regions 136 of the texture map 130 (which correspond to the static portions 504 of the facial gesture model 108), thereby producing the image map 132 of the dynamic texture map 130, which is a combination of the series of images 502 of the face and static imagery of the remainder of the head. The projection-mapped region 134 of the dynamic texture map 130 maps to the dynamic portions 506 of the facial gesture model 108. The UV-mapped region 136 of the dynamic texture map 130 maps to the static portions 504 of the facial gesture model 108.

The imagery of the static portions 504 of the facial gesture model of the subject head may be developed from the photogrammetric scan 102. A static portion 504 of the facial gesture model 108 may be identified prior to stitching together the image map 132. In some examples, identifying the static portion 504 may involve selecting or delineating a static portion 504 and a dynamic portion 506, or a boundary between the static portion 504 and the dynamic portion 506 based on identification of portions of the facial gesture model 108 that do not move, or move only minimally, in the photogrammetric scan 102. In other examples, the static portions 504 and dynamic portions 502, may be selected or delineated based on pre-existing specifications, which may be based on, for examples, heuristics describing which portions of an avatar's head are likely to be in motion or not in motion during a facial performance.

Thus, the method 400 involves a combination of projection mapping and UV-mapping. Whereas projection mapping does not maintain angle preserving functions, conformational mapping does. The image map 130 is therefore a combination of UV-mapped regions 136 which contain fixed geometries with respect to vertexes and positional movement, and projection-mapped regions 134 which float over the underlying geometry of the facial gesture model 108 and is not contained by fixed geometries with respect to vertexes and positional movement. Since the projected images from the video 104 fall onto the geometrically appropriate places on the face of the facial gesture model 108, the images in the series of images 502 that is subsequently captured account for movement of the facial gesture model 108. When the series of images 502 is then applied as a texture to the facial gesture model 108 as part of the dynamic texture map 130, the result is that the facial movements of the emulated facial performance 106 are highly realistic. Further, the subtle details of the subject's face that are captured in the video 104 are included in the resulting animation.

Figure 6:
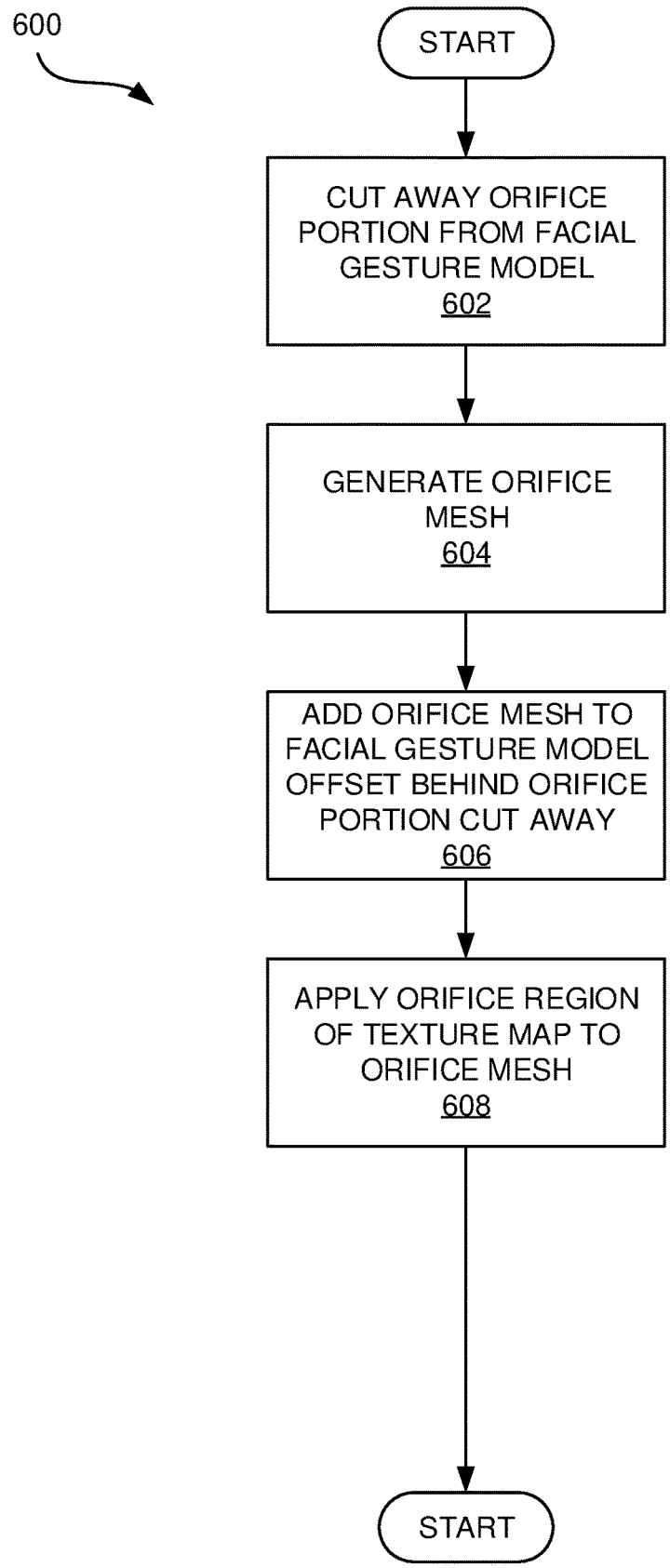
FIG. 6 is a flowchart of an example method for animating an orifice of a facial performance of an avatar.

FIG. 6 is a flowchart of an example method 600 for animating an orifice of a facial performance of an avatar. In some examples, the method 600 may be performed in addition to the method 200 of FIG. 2 to animate a facial performance of an avatar using a dynamic texture map. In other examples, the method 600 may be applied to animate an avatar using other kinds of texture maps. However, for convenience, the method 600 is described with reference to the system 100 of FIG. 1, but this is not limiting, as the method 600 may be applied to other systems. Further, one or more blocks of the method 600 may be embodied in programming instructions stored on a non-transitory machine-readable storage medium executable by a processor of a computing device. These instructions may be incorporated into an animation, modelling, or game development tool executable by the animation systems 110. Further, one or more of the blocks of the method 600 may be initiated or assisted by a user of the animation systems 110.

Animating an orifice of a facial performance may involve animating an interior mouth portion, eye portion, or other part of an avatar that corresponds to a part of the subject head that includes an opening, a cavity, or a part that is visible through an opening in the avatar. Although the subject head includes such an opening (i.e. an opening to a mouth cavity or an eye cavity), the photogrammetric scan 102 generally will not capture the contours of such an opening or cavity, and thus, without being modified as discussed herein, the mesh of the facial gesture model 108 may cover such an opening, causing any texture applied to the facial gesture model 108 to similarly cover the opening, thereby producing a visually unrealistic performance, particularly when an observer of the facial gesture model 108 would expect to view depth through the opening. As discussed herein, the appearance of an opening or cavity is simulated by the use of a separate orifice mesh offset behind the part of the avatar corresponding to the opening.

At block 602, an orifice portion is cut away from a mesh of the facial gesture model 108 of the subject head. Where the orifice being animated is a mouth, the orifice portion may be referred to as an interior mouth portion. Where the orifice being animated is an eye, the orifice portion may be referred to as an eye portion. Where the orifice portion is an interior mouth portion, the interior mouth portion may be delineated by the part of the avatar corresponding to its lips or another part of the avatar that approximately delineates the opening to the mouth. Where the orifice portion is an eye portion, the eye portion may be delineated by the part of the avatar corresponding to its eyelids or another part of the avatar the approximately delineates the opening to the eye cavity.

At block 604, an orifice mesh is generated. Thus, the orifice mesh may be a mouth mesh, or an eye mesh, as the case may be. The mouth mesh, eye mesh, or other orifice mesh, as will be seen below, is to serve as a visual replacement for the portion of the facial gesture model 108 that was cut away.

Figure 7A:
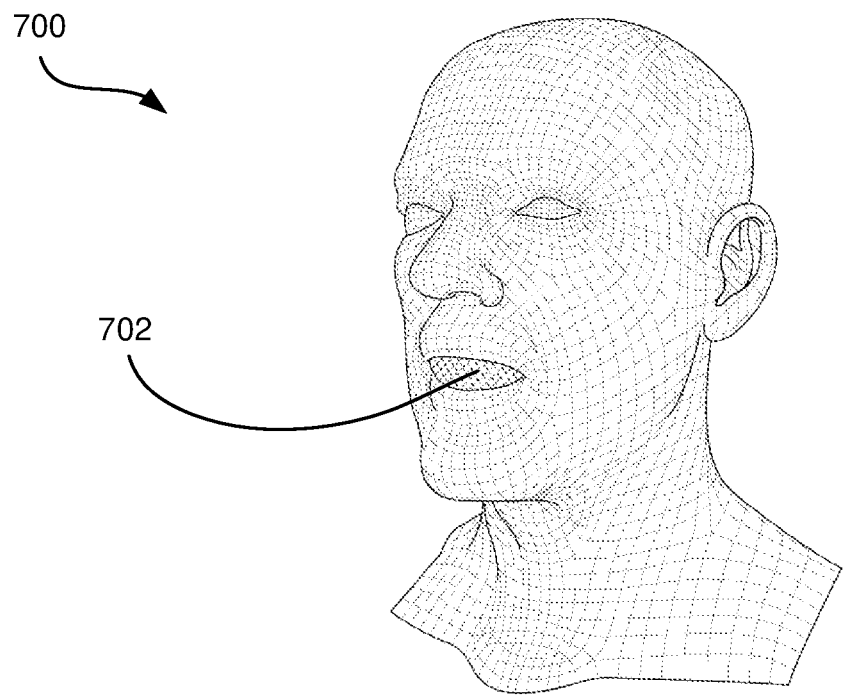
FIG. 7A is an illustration of a three-dimensional rendering of a head of a subject that exhibits a facial gesture model, the model including a separate mouth mesh.
Figure 8A:
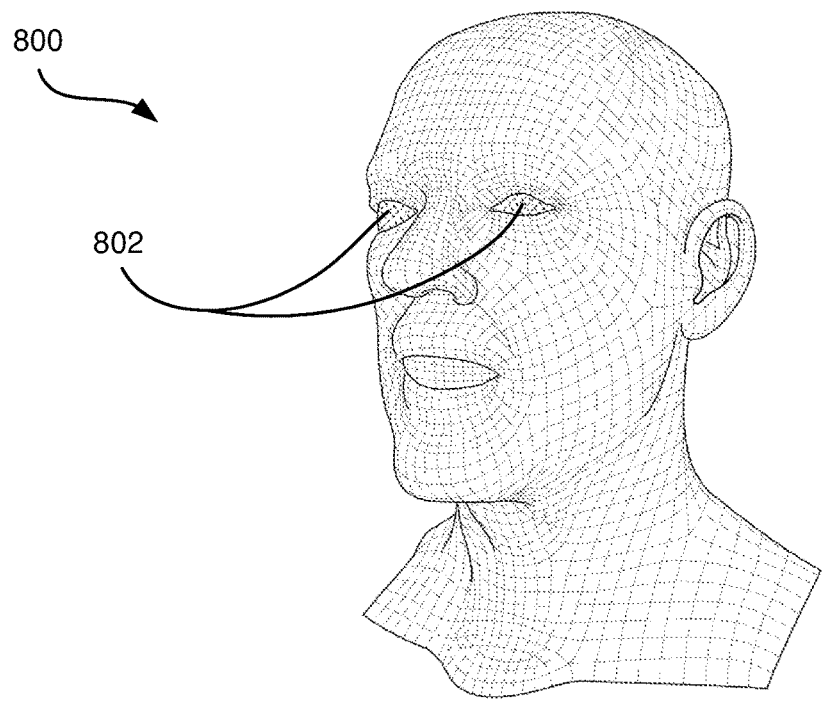
FIG. 8A is an illustration of another three-dimensional rendering of a head of a subject that exhibits a facial gesture model, the model including a separate eye mesh.

At block 606, the orifice mesh is added, or attached, to the facial gesture model 108 of the subject head. The orifice mesh is offset behind a position from which the orifice portion was cut away. For example, in the case of animating a mouth, the mouth mesh is slightly offset behind the opening to the mouth. In the case of animating an eye, the eye mesh is slightly offset behind the eyelids or the opening to the eye cavity. The orifice mesh being offset behind the portion of the facial gesture model 108 that was cut away provides an amount of visual depth, and further, allows for the remaining portions of the facial gesture model 108 that were not cut away (i.e. the lips and outer mouth area in the case of a mouth mesh, and the eyelids and outer eye area in the case of an eye mesh) to open, close, and move with respect to the orifice mesh, independently of the orifice mesh, providing further realism to the avatar. FIG. 7A provides an illustration of a three-dimensional rendering 700 of the facial gesture model 108 with a separate mouth mesh 702. FIG. 8A provides an illustration of a three-dimensional rendering 800 of the facial gesture model 108 with separate eye meshes 802.

Returning to FIG. 6, at block 608, an orifice region of the dynamic texture map 130 is applied to the orifice mesh. That is, the mouth map 742 is applied to the mouth mesh 702, or the eye map(s) 842 is/are applied to the eye mesh(es) 802. Application of the dynamic texture map 130 to the orifice mesh may involve projecting the orifice region (e.g., mouth map 742) of the dynamic texture map 130 onto the animated orifice mesh (e.g., mouth mesh 702), and baking the projections into the animated orifice mesh (e.g., mouth mesh 702).

Figure 7B:
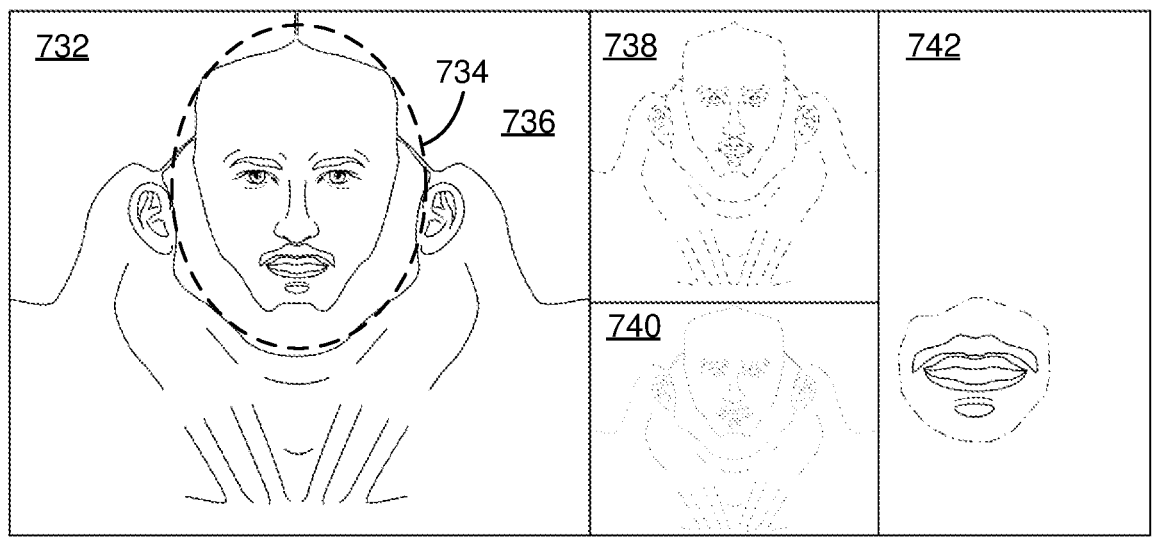
FIG. 7B is a schematic diagram of another example dynamic texture map for animating a facial performance of an avatar, the dynamic texture map including a separate mouth region to be applied to a mouth mesh.
Figure 8B:
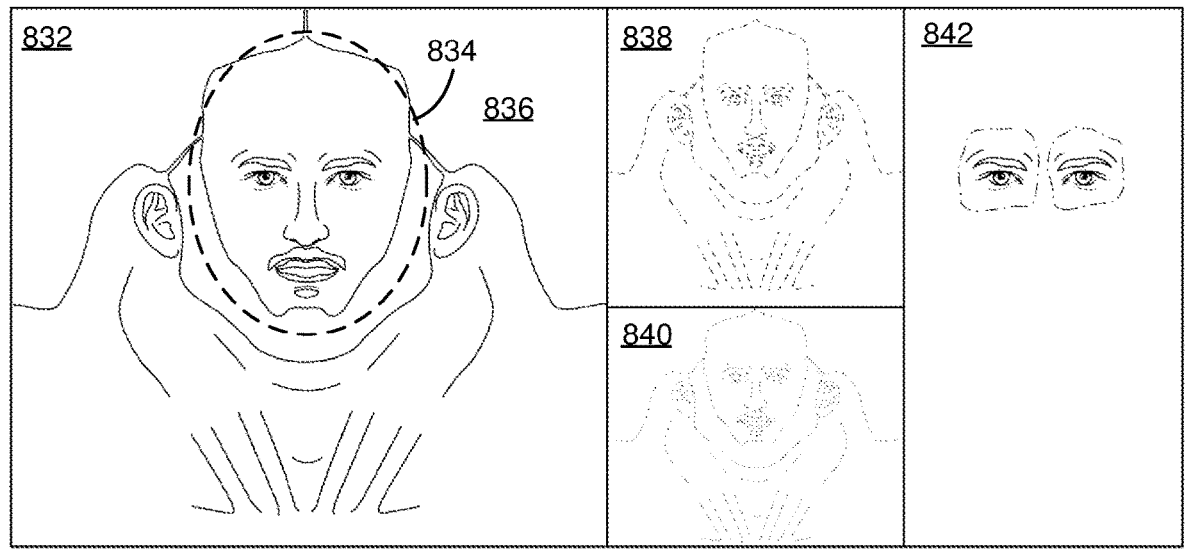
FIG. 8B is a schematic diagram of another example dynamic texture map for animating a facial performance of an avatar, the dynamic texture map including a separate eye region to be applied to an eye mesh.

Thus, a mouth, eye, or other orifice of an avatar may be more realistically animated with fewer incidence of "skating" artefacts. The orifice region of the dynamic texture map 130 may be identified prior to applying the orifice region to the orifice mesh. The orifice region is the region of the dynamic texture map 130 that corresponds to the orifice in the subject head. In the case of animating a mouth, the orifice region is a mouth region of the dynamic texture map that corresponds to a mouth of the subject head. In the case of animating an eye, the orifice region is an eye region of the dynamic texture map that corresponds to an eye of the subject head. FIG. 7B provides a schematic diagram of another example dynamic texture map 730 that is similar to the dynamic texture map 130 of FIG. 1, and thus includes an image map 732 with a projection-mapped region 734 and UV-mapped region 736, but further includes a mouth map 742 that corresponds to a mouth region of the image map 732 that is to be applied to the mouth mesh 702 of FIG. 7A. Similarly, FIG. 8B provides a schematic diagram of another example dynamic texture map 830 that is similar to the dynamic texture map 130 of FIG. 1, and thus includes an image map 832 with a projection-mapped region 834 and UV-mapped region 836, but further includes one or more eye maps 842 that correspond to one or more eye regions of the image map 832, and that is to be applied to the mouth mesh 802 of FIG. 8A.

Aspects of the orifice mesh may be designed to further enhance the realism of the avatar. For example, the orifice mesh and the orifice region of the dynamic texture map 130 mapped onto the orifice mesh may be larger than the region of the dynamic texture map 130 that corresponds to the orifice portion that was cut away. The orifice mesh being larger than the portion of the avatar that was cut away provides a padding or buffer area that fills in any visual gap between the orifice mesh and the remainder of the avatar model that might have otherwise been made visible by offsetting the orifice mesh behind the orifice opening in the avatar. As another example, a textural property of the orifice mesh, such as a colour, specular quality, may be modified to blend an edge of the orifice mesh with a remaining portion of the facial gesture model 108 adjacent to the orifice portion that was cut away. In the case of animating a mouth, the edges of the mouth mesh may be made darker to better blend into the remainder of the mesh of the facial gesture model 108.

Further, in the case of animating a mouth, the method 600 may further involve generating a mouth gesture model that moves along with the facial performance. Such a mouth gesture model may animate the mouth mesh in synchronization with facial gesture model 108 to provide a further more realistic performance.

Further in the case of animating an eye, the method 600 may further involve editing a specular map or adding a separate specular map for the eyes to the eye mesh that is distinct from the specular map 838 to achieve certain lighting improvements. For example, the video 104 may be edited to remove glare from lighting used to capture the video 104 of the face of the subject head delivering the facial performance (unrealistic static captured specular highlight), thereby removing unrealistic glare from the eyes. As another example, an integrated specular map (i.e. wet map) may be added which is configured to increase glossiness of the eye mesh relative to the remaining portions of the facial gesture model 108 adjacent to the eye portion that was cut away, thereby adding a more realistic glossy appearance to the eyes.

Thus, a facial performance of an avatar may be animated on a relatively lower-powered machine with high realism using a dynamic texture map or one or more separate orifice meshes. An emulated facial performance of for an avatar may be generated and applied to a relatively low-resolution model of the avatar to produce a highly realistic visual performance for relatively low cost and processing power that is competitive with visual performances produced by more costly techniques.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method for animating a facial performance of an avatar, the method comprising:
   photogrammetrically scanning a subject head performing a collection of facial gestures to develop a facial gesture model of the subject head;
   capturing a video of a face of the subject head delivering a facial performance;
   generating a dynamic texture map combines the video of the face of the subject head delivering the facial performance with a static portion of the facial gesture model of the subject head;
   applying the dynamic texture map to the facial gesture model;
   generating an orifice mesh;
   adding the orifice mesh to the facial gesture model of the subject head, the orifice mesh offset behind a position of an orifice portion that is absent from the facial gesture model of the subject head;
   applying an orifice region of the dynamic texture map to the orifice mesh; and
   animating the facial gesture model of the subject head to emulate the facial performance.

2. The method of claim 1, wherein generating the dynamic texture map comprises:
   projecting the video of the face of the subject head delivering the facial performance onto the facial gesture model emulating the facial performance;
   capturing a series of images of a face of the facial gesture model emulating the facial performance; and
   stitching together the series of images of the face of the facial gesture model emulating the facial performance with imagery of a static portion of the facial gesture model of the subject head;
   wherein the dynamic texture map comprises projection-mapped regions derived from images of the projection of the video onto the facial gesture model and UV-mapped regions derived from a photogrammetric scan of the subject head.

3. The method of claim 1, wherein the orifice portion of the facial gesture model comprises an interior mouth portion of the facial gesture model that covers a mouth cavity of the avatar, the orifice mesh comprises a mouth mesh, the orifice region of the dynamic texture map comprises a mouth region of the dynamic texture map that corresponds to a mouth of the subject head.

4. The method of claim 3, wherein the method further comprises generating a mouth gesture model to animate the mouth mesh in synchronization with the facial gesture model.

5. The method of claim 1, wherein the orifice portion of the facial gesture model comprises an eye portion of the facial gesture model that covers an eye cavity of the avatar, the orifice mesh comprises an eye mesh, the orifice region of the dynamic texture map comprises an eye region of the dynamic texture map that corresponds to an eye of the subject head.

6. The method of claim 5, wherein the method further comprises:
removing glare from lighting used to capture the video of the face of the subject head delivering the facial performance; and
adding a specular map to the eye mesh to increase glossiness of the eye mesh relative to a remaining portion of the facial gesture model adjacent to the eye portion that was cut away.

7. The method of claim 1, wherein the orifice mesh and the orifice region of the dynamic texture map mapped onto the orifice mesh are larger than a region of the dynamic texture map that corresponds to the orifice portion that was cut away.

8. The method of claim 1, further comprising:
modifying a textural property of the orifice mesh to blend an edge of the orifice mesh with a remaining portion of the mesh of the facial gesture model adjacent to the orifice portion that was cut away.

9. A non-transitory machine-readable storage medium comprising instructions that when executed cause a processor of a computing device to:
generate a dynamic texture map that combines a video of a face of a subject head delivering a facial performance with a static portion of a facial gesture model of the subject head, the facial gesture model generated by a photogrammetric scan of the subject head performing a collection of facial gestures;
apply the dynamic texture map to the facial gesture model;
generate an orifice mesh;
add the orifice mesh to the facial gesture model of the subject head, the orifice mesh offset behind a position of an orifice portion that is absent from the facial gesture model of the subject head;
apply an orifice region of the dynamic texture map to the orifice mesh; and
animate the facial gesture model of the subject head to emulate the facial performance of an avatar.

10. The non-transitory machine-readable storage medium of claim 8, wherein the instructions are further to cause the processor of the computing device to generate the dynamic texture map by:
projecting the video of the face of the subject head delivering the facial performance onto the facial gesture model emulating the facial performance;
capturing a series of images of a face of the facial gesture model emulating the facial performance; and
stitching together the series of images of the face of the facial gesture model emulating the facial performance with imagery of a static portion of the facial gesture model of the subject head;
wherein the dynamic texture map comprises projection-mapped regions derived from images of the projection of the video onto the facial gesture model and UV-mapped regions derived from the photogrammetric scan.

11. The non-transitory machine-readable storage medium of claim 9, wherein the orifice portion of the facial gesture model comprises an interior mouth portion of the facial gesture model that covers a mouth cavity of the avatar, the orifice mesh comprises a mouth mesh, the orifice region of the dynamic texture map comprises a mouth region of the dynamic texture map, and the instructions are further to cause the processor of the computing device to generate a mouth gesture model to animate the mouth mesh in synchronization with the facial gesture model.

12. The non-transitory machine-readable storage medium of claim 9, wherein the orifice portion of the facial gesture model comprises an eye portion of the facial gesture model, the orifice mesh comprises an eye mesh, the orifice region of the dynamic texture map comprises an eye region of the dynamic texture map, and the instructions are further to cause the processor of the computing device to:
reduce glare from lighting used to capture the video of the face of the subject head delivering the facial performance; and add a specular map to the eye mesh to increase glossiness of the eye mesh relative to a remaining portion of the facial gesture model adjacent to the eye portion that was cut away.

13. The non-transitory machine-readable storage medium of claim 9, wherein the orifice mesh and the orifice region of the dynamic texture map mapped onto the orifice mesh are larger than a region of the dynamic texture map that corresponds to the orifice portion that was cut away.

14. The non-transitory machine-readable storage medium of claim 9, wherein the instructions are further to cause the processor of the computing device to:
modify a textural property of the orifice mesh to blend an edge of the orifice mesh with a remaining portion of the mesh of the facial gesture model adjacent to the orifice portion that was cut away.

15. A system for animating a facial performance of an avatar, the system comprising:
a memory to store:
a facial gesture model of a subject head derived from a photogrammetric scan of the subject head; and
a video of a face of the subject head delivering a facial performance; and
a processor to:
generate a dynamic texture map that combines the video of the face of the subject head delivering the facial performance with a static portion of the facial gesture model of the subject head;
apply the dynamic texture map to the facial gesture model;
generate an orifice mesh;
add the orifice mesh to the facial gesture model of the subject head, the orifice mesh offset behind a position of an orifice portion that is absent from the facial gesture model of the subject head;
apply an orifice region of the dynamic texture map to the orifice mesh; and
animate the facial gesture model of the subject head to emulate the facial performance.

16. The system of claim 9, wherein the processor is to generate the dynamic texture map by:
projecting the video of the face of the subject head delivering the facial performance onto the facial gesture model emulating the facial performance;
capturing a series of images of a face of the facial gesture model emulating the facial performance; and
stitching together the series of images of the face of the facial gesture model emulating the facial performance with imagery of a static portion of the facial gesture model of the subject head;
wherein the dynamic texture map comprises projection-mapped regions derived from images of the projection of the video onto the facial gesture model and UV-mapped regions derived from the photogrammetric scan.

17. The system of claim 15, further comprising a head-mountable camera to capture the video of the subject head delivering the facial performance.

\* \* \* \* \*